(12) United States Patent
Hucks et al.

(10) Patent No.: US 7,279,544 B2
(45) Date of Patent: Oct. 9, 2007

(54) TRANSESTERIFICATION PROCESS FOR THE PRODUCTION OF POLYCARBONATES HAVING A LOW CONTENT OF VOLATILE COMPOUNDS

(75) Inventors: Uwe Hucks, Alpen (DE); Melanie Möthrath, Düsseldorf (DE); Helmut-Werner Heuer, Krefeld (DE); Thomas König, Leverkusen (DE); Lydia Simon, Brasschaat (BE); Marc Buts, Duffel (BE); Johan Vanden Eynde, Zwijnaarde (BE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/002,866

(22) Filed: Dec. 2, 2004

(65) Prior Publication Data

US 2005/0131197 A1     Jun. 16, 2005

(30) Foreign Application Priority Data

Dec. 6, 2003 (DE) ............................. 103 57 161

(51) Int. Cl.
*C08G 64/00* (2006.01)

(52) U.S. Cl. ............... 528/196; 524/115; 502/150; 502/208; 528/198

(58) Field of Classification Search ............... 524/115; 528/196, 198; 502/150, 208
See application file for complete search history.

(56) References Cited

U.S. PATENT DOCUMENTS

| | | | |
|---|---|---|---|
| 3,022,272 A | 2/1962 | Schnell et al. | 260/47 |
| 5,340,905 A | 8/1994 | Kühling et al. | 528/199 |
| 5,399,659 A * | 3/1995 | Kuhling et al. | 528/199 |
| 5,717,057 A | 2/1998 | Sakashita et al. | 528/198 |
| 5,821,322 A | 10/1998 | Brunelle et al. | 528/199 |
| 6,228,973 B1 | 5/2001 | McCloskey et al. | 528/196 |
| 6,265,525 B1 | 7/2001 | Kinoshita et al. | 528/196 |
| 6,271,290 B1 | 8/2001 | Inoue et al. | 524/145 |
| 6,277,946 B1 | 8/2001 | van Heijkant et al. | 528/196 |
| 6,329,495 B2 | 12/2001 | Kinoshita et al. | 528/196 |
| 6,350,848 B1 | 2/2002 | Kinoshita et al. | 528/196 |
| 6,630,563 B2 | 10/2003 | Hucks et al. | 528/196 |
| 6,740,708 B2 | 5/2004 | Bruls et al. | 525/66 |
| 6,753,403 B2 | 6/2004 | Kinoshita et al. | 528/196 |
| 6,838,543 B2 | 1/2005 | Kaempf et al. | 528/196 |
| 6,887,970 B2 | 5/2005 | Kratschmer et al. | 528/196 |
| 2001/0007014 A1 | 7/2001 | Kinoshita et al. | 528/196 |
| 2002/0026029 A1 | 2/2002 | Kinoshita et al. | 528/196 |
| 2002/0123604 A1 | 9/2002 | Kinoshita et al. | 528/196 |
| 2002/0156191 A1 | 10/2002 | Bruls et al. | 525/178 |
| 2002/0177684 A1 | 11/2002 | Kratschmer et al. | 528/196 |
| 2002/0188091 A1 | 12/2002 | Hucks et al. | 528/196 |
| 2002/0193554 A1 | 12/2002 | Hirata et al. | 528/196 |
| 2003/0027941 A1 | 2/2003 | Sawaki et al. | 525/461 |
| 2004/0063824 A1 * | 4/2004 | Takagi et al. | 524/115 |
| 2004/0106765 A1 | 6/2004 | Kaempf et al. | 528/196 |
| 2004/0143088 A1 | 7/2004 | Kratschmer et al. | 528/199 |

FOREIGN PATENT DOCUMENTS

| | | |
|---|---|---|
| DE | 1 031 512 | 6/1958 |
| JP | 2003-155338 | 5/2003 |

* cited by examiner

*Primary Examiner*—Terressa Boykin
(74) *Attorney, Agent, or Firm*—Joseph C. Gil; Aron Preis

(57) ABSTRACT

A multi stage process for the production of polycarbonates having low monomer content is disclosed. The process entails, in sequence, (i) transesterifying in the melt at least one dihydroxyaryl compound with at least one diaryl carbonate in the presence of at least one onium catalyst to produce a polycondensate that contains monomers, (ii) introducing into the polycondensate an inhibitor in an hypostoichiometric amount in relation to the catalyst and (iii) reducing in a finishing reactor the content of monomers in said polycondensate. The polycarbonate thus produced is characterized in that it contains less than 350 ppm of diphenyl carbonate, less than 40 ppm of 2,2-bis-(4-hydroxyphenyl)propane and less than 150 ppm of phenol.

11 Claims, No Drawings

TRANSESTERIFICATION PROCESS FOR THE PRODUCTION OF POLYCARBONATES HAVING A LOW CONTENT OF VOLATILE COMPOUNDS

FIELD OF THE INVENTION

The invention concerns a process for the production of polycarbonates and more particularly transesterification process.

SUMMARY OF THE INVENTION

A multi stage process for the production of polycarbonates having low monomer content is disclosed. The process entails, in sequence, (i) transesterifying in the melt at least one dihydroxyaryl compound with at least one diaryl carbonate in the presence of at least one onium catalyst to produce a polycondensate that contains monomers, (ii) introducing into the polycondensate an inhibitor in an hypostoichiometric amount in relation to the catalyst and (iii) reducing in a finishing reactor the content of monomers in said polycondensate. The polycarbonate thus produced is characterized in that it contains less than 350 ppm of diphenyl carbonate, less than 40 ppm of 2,2-bis-(4-hydroxyphenyl)propane and less than 150 ppm of phenol.

TECHNICAL BACKGROUND OF THE INVENTION

Within the meaning of the present invention residual monomers are understood to be the true monomers, i.e. dihydroxyaryl compounds and diaryl carbonates, and volatile components of all types, such as e.g. low-molecular-weight reaction products, monohydroxyaryl compounds, and decomposition and cleavage products that are formed in the transesterification process, along with all secondary compounds which are introduced by the above mentioned raw materials. Low-molecular-weight reaction products in connection with the residual monomers should be understood to be degrees of polycondensation of up to 3. If the end groups on these molecules are considered and added together, then the result is formally a monohydroxyaryl compound or a dihydroxyaryl compound or a diaryl carbonate.

Production processes for polycarbonate are known from the literature and described in many applications:

Polycarbonate may be produced by the melt transesterification process. The production of aromatic oligocarbonates or polycarbonates by the melt transesterification process is known from the literature and laid down for example in the Encyclopedia of Polymer Science, Vol. 10 (1969), Chemistry and Physics of Polycarbonates, Polymer Reviews, H. Schnell, Vol. 9, John Wiley and Sons, Inc. (1964), and in DE-C 1 031 512, U.S. Pat. No. 3,022,272, U.S. Pat. No. 5,340,905 and U.S. Pat. No. 5,399,659.

Polycarbonates produced by the interfacial polycondensation process generally have low contents of residual monomers.

By contrast, the transesterification process always leads to products with residual monomer contents of monohydroxyaryl compounds, dihydroxyaryl compounds and diaryl carbonates.

These residual monomer contents are troublesome and undesirable for certain applications, such as in the area of food or medicine for example, and in the production of optical data carriers.

In production by the transesterification process, certain measures must therefore be taken once the desired molecular weight has been obtained in order to reduce the residual monomer content.

Catalysts having an alkaline effect are generally used in the production of polycarbonates by the transesterification process. Production line designs are such that various catalysts or combinations of different catalysts in varying quantities are necessary. Combinations of onium compounds, onium compounds being understood hereafter to be members of the group of ammonium and phosphonium compounds, and alkali or alkaline-earth compounds having an alkaline effect are described in the literature (DE 4 312 390 A1, EP 719 816 B1, U.S. Pat. No. 6,228,973 B1 are cited here by way of example). Whilst many of the onium compounds having a catalytic effect are more or less destroyed during the course of the reaction, alkali or alkaline-earth compounds having an alkaline effect remain in their active form even after the reaction. In order to obtain polycarbonates having a low residual monomer content, it is essential to stop the reaction or to neutralize the catalysts, particularly alkali or alkaline-earth compounds, after the reaction and before the subsequent separation of the residual monomers. Equivalents of inhibitors in marked excess relative to the catalysts used, in particular relative to the alkaline or alkaline-earth catalysts, are generally used to this end.

Thus WO-A 00/77 073 describes a melt transesterification for polycarbonate with onium catalysts in combination with alkali or alkaline-earth compounds. To obtain polycarbonates having a low residual monomer content, the polymer must be quenched after the reaction with a marked excess (for example 6 equivalents) of acid compounds, such as sulfonic acid esters for example, relative to the equivalents of alkali or alkaline-earth catalyst used, in order then to free it from the residual monomers in an additional process step in an extruder or reactor. At the same time a transition metal scavenger such as ortho-phosphoric acid, for example, is added in small amounts.

EP-A 1 275 677 describes an alkali-catalysed melt transesterification process for polycarbonate in which after the reaction the alkaline catalyst is quenched with 2 equivalents (relative to alkali catalyst equivalents) of sulfonic acid ester and then in an additional process step the residual monomers are removed in an extruder.

The aim, however, is for modem applications in the electronic sector and in storage media to use polycarbonates that in addition to having a low residual monomer content are also substantially electrolyte-free or at least have a low electrolyte content, i.e. that are substantially ion-free or at least have a low ion content. Polycarbonates having a low electrolyte content within the meaning of the invention are those whose alkali and alkaline-earth content is <60 ppb, preferably <40 ppb and particularly preferably <20 ppb.

As described above, however, alkaline or alkaline-earth catalysts remain in the polycarbonate and, as impurities, have a negative effect on the polymer properties. The polycarbonates are then not suitable for the production of certain products. In addition, these polycarbonates generally have to be stabilized with suitable additives, causing other ions to be introduced.

The use of certain pure onium catalysts without the additional use of alkali or alkaline-earth compounds having an alkaline effect is therefore particularly advantageous for the production of polycarbonates having a low electrolyte content. By contrast, the use of alkali or alkaline-earth compounds having an alkaline effect, even in combination with onium catalysts, is not suitable for obtaining polycarbonates having a low electrolyte content.

The special advantage of selected onium catalysts lies in the fact that because of their thermal instability, their concentration in the reaction melt reduces considerably at the end of the production process. The condensation of oligocarbonates takes place using raw materials of the highest purity in selected reactors, as described for example in WO-A 02/077 067, EP A 1 253 163, JP 2 003 155 338, U.S. Pat. No. 6,329,495, WO A 99 28 370, and WO 02 044 244. However, as with other processes too, the polycarbonates produced in this way contain residual monomers in equilibrium with the polymer.

Starting from the prior art the object was therefore to find an economical process which provides polycarbonates having a low residual monomer content which at the same time are electrolyte-free or at least have a low electrolyte content, with the minimum possible technical complexity.

Surprisingly it was found that polycarbonates having a low residual monomer content which at the same time are electrolyte-free or at least have a low electrolyte content may be produced in excellent quality by the transesterification process with no additional technical complexity in an existing multistage production line, in that in a multistage process performed without alkali or alkaline-earth catalysis the final molecular weight is established earlier which means already in the penultimate reactor and, after stopping or inhibiting the reaction with extremely small amounts of acid compounds, the residual monomers present in the end phase of the process, i.e. in the final reactor, known as the finishing reactor, may be removed by evaporation. The necessary amounts of inhibitors are hypostoichiometric relative to the amounts of catalyst used, and also hypostoichiometric relative to residual amounts of phosphorus that are found.

The high product qualities that are obtained are all the more surprising because the residence times in the final or finishing reactors may range from 15 min to several hours, whereas in the conventionally used devices for removing residual monomers or volatile impurities, such as extruders, extrusion evaporators, film evaporators (filmtruders), etc., they are in the range of a few minutes only. The person skilled in the art would have expected that with the long residence times and the high temperatures the chemical equilibrium would be constantly readjusting and the molecular weight would increase.

The quality, discoloration and content of undesirable secondary compounds would also have been expected to be markedly inferior. Undesirable secondary compounds are branching agents, for example, and decomposition and cleavage products of the transesterification process, which may lead to this reduction in quality.

For processing reasons, however, the short residence times that are necessary according to the prior art cannot be set in the final reactors that are used for polycondensation. It was therefore in no way obvious that polycarbonates having a low monomer content could be obtained in outstanding quality from a production line with no special device for the removal of residual monomers or volatile impurities.

The reactors described in WO-A 02/077 067, EP A 1 253 163 (U.S. Pat. No. 6,630,563), JP 2 003 155 338, U.S. Pat. No. 6,329,495, WO A 99/28 370, WO 02 044 244 and KR 0 104 915 are preferably used as final reactors. The reactors described in WO-A 02/077 067, EP A 1 253 163, JP 2 003 155 338, U.S. Pat. No. 6,329,495, WO A 99/28 370 and WO 02 044 244 are particularly preferably used and most particularly preferably the reactors described in WO-A 02/077067 and EP A 1 253 163, which are also referred to as basket reactors.

In a process where only onium catalysis is applied the amounts of inhibitors to be used are surprisingly particularly low. This is particularly advantageous for product quality, because the residues of troublesome compounds arising from the catalysis and inhibition are reduced to a minimum. The fact that only extremely small quantities of inhibitors are sufficient to quench the reaction was not obvious and could also not have been anticipated from the prior art.

As mentioned in the prior art, at least stoichiometric amounts of quenchers have to be used with alkali or alkaline-earth catalysts in order to reliably deactivate all catalytically active species. Surprisingly, in the process according to the invention on the other hand, amounts of quenchers that are hypostoichiometric relative to the amounts of catalyst originally used and also hypostoichiometric relative to residual amounts of phosphorus that are found, which are regarded as catalyst, are sufficient.

In short, a result such as that described here is in no way obvious but on the contrary is most surprising.

In continuous melt transesterification the output of a production line depends inter alia on the temperature and residence time profile throughout the process stages. Reducing the residual monomer content with no additional equipment has a detrimental effect on output because ultimately reactor capacity is lost. This may be compensated for to a certain extent in the management of the process by changing the temperature and pressure profiles, but excessive changes easily result in loss of quality. The order of magnitude of the output losses is such, however, that economical production of polycarbonate is still possible.

Another possibility would be to operate with increased amounts of catalyst, which would result in improved output but would then lead to products with elevated electrolyte contents, in other words poor properties.

The same installations used for alloying the polycarbonate with additives, such as extruders or static mixers, which are generally located immediately after the final reactors, may be used for the final formulation (incorporation of additives) of the polycarbonate produced, with no need to fit in an additional process step, in this case monomer reduction.

Another advantage is that various polycarbonate grades with varying requirements may be produced in the installations with no need for equipment changes.

A production line design such as that described in WO 02/077 067 (US 2002/0177684 incorporated herein by reference), for example, may be used to perform the process.

Suitable dihydroxyaryl compounds for the production of polycarbonates are those having the formula

wherein Z is an aromatic radical having 6 to 30 C atoms which may contain one or more aromatic nuclei, may be substituted and may contain aliphatic or cycloaliphatic radicals or alkyl aryls or heteroatoms as binding links.

Examples of dihydroxyaryl compounds are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl)ethers, bis(hydroxyphenyl)ketones, bis (hydroxyphenyl)sulfides, bis(hydroxyphenyl)sulfones, bis (hydroxyphenyl)sulfoxides, 1,1'-bis(hydroxyphenyl diisopropyl benzenes, and ring-alkylated and ring-halogenated compounds thereof.

These and other dihydroxyaryl compounds that are also suitable are described for example in the U.S. Pat. Nos. 2,970,131, 2,991,273, 2,999,835, 2,999,846, 3,028,365, 3,062,781, 3,148,172, 3,271,367, 3,275,601, 4,982,014, in the German patent specifications 1 570 703, 2 063 050, 2 036 052, 2 211 956, 3 832 396, the French patent specification 1 561 518, and in the monograph "H. Schnell, Chemistry and Physics of Polycarbonates, Interscience Publishers, New York 1964, p. 28ff; p. 102ff", and in "D. G. Legrand, J. T. Bendler, Handbook of Polycarbonate Science and Technology, Marcel Dekker New York 2000, p. 72ff".

Preferred dihydroxyaryl compounds are, for example: resorcinol, 4,4'-dihydroxydiphenyl, bis-(4-hydroxyphenyl) methane, bis-(3,5-dimethyl-4-hydroxyphenyl)methane, bis-(4-hydroxyphenyl)diphenyl methane, 1,1-bis-(4-hydroxyphenyl)-1-phenyl ethane, 1,1-bis-(4-hydroxyphenyl)-1-(1-naphthyl)ethane, 1,1-bis-(4-hydroxyphenyl)-1-(2-naphthyl) ethane, 2,2-bis-(4-hydroxyphenyl)propane, 2,2-bis-(3-methyl-4-hydroxyphenyl)propane, 2,2-bis-(3,5-dimethyl-4-hydroxyphenyl)propane, 2,2-bis-(4-hydroxyphenyl)-1-phenyl propane, 2,2-bis-(4-hydroxyphenyl) hexafluoropropane, 2,4-bis-(4-hydroxyphenyl)-2-methyl butane, 2,4-bis-(3,5-dimethyl-4-hydroxyphenyl)-2-methyl butane, 1,1-bis-(4-hydroxyphenyl)cyclohexane, 1,1-bis-(3,5-dimethyl-4-hydroxyphenyl)cyclohexane, 1,1-bis-(4-hydroxyphenyl)-4-methyl cyclohexane, 1,1-bis-(4-hydroxyphenyl)-3,3,5-trimethyl cyclohexane, 1,3-bis-[2-(4-hydroxyphenyl)-2-propyl]benzene, 1,1'-bis-(4-hydroxyphenyl)-3-diisopropyl benzene, 1,1'-bis-(4-hydroxyphenyl)-4-diisopropyl benzene, 1,3-bis-[2-(3,5-dimethyl-4-hydroxyphenyl)-2-propyl]benzene, bis-(4-hydroxyphenyl)ether, bis-(4-hydroxyphenyl)sulfide, bis-(4-hydroxyphenyl)sulfone, bis-(3,5-dimethyl-4-hydroxyphenyl)sulfone and 2,2',3,3'-tetrahydro-3,3,3',3'-tetramethyl-1,1'-spirobi-[1H-indene]-5,5'-diol.

Particularly preferred dihydroxyaryl compounds are: resorcinol, 4,4'-dihydroxydiphenyl, bis-(4-hydroxyphenyl) diphenyl methane, 1,1-bis-(4-hydroxyphenyl)-1-phenyl ethane, bis-(4-hydroxyphenyl)-1-(1-naphthyl)ethane, bis-(4-hydroxyphenyl)-1-(2-naphthyl)ethane, 2,2-bis-(4-hydroxyphenyl)propane, 2,2-bis-(3,5-dimethyl-4-hydroxyphenyl) propane, 1,1-bis-(4-hydroxyphenyl)cyclohexane, 1,1-bis-(3,5-dimethyl-4-hydroxyphenyl)cyclohexane, 1,1-bis-(4-hydroxyphenyl)-3,3,5-trimethylcyclohexane, 1,1'-bis-(4-hydroxyphenyl)-3-diisopropyl benzene and 1,1'-bis-(4-hydroxyphenyl)-4-diisopropyl benzene.

Most particularly preferred are: 4,4'-dihydroxydiphenyl, 2,2-bis-(4-hydroxyphenyl)propane and bis-(4-hydroxyphenyl)-3,3,5-trimethylcyclohexane.

Both one dihydroxyaryl compound, forming homopolycarbonates, and several dihydroxyaryl compounds, forming copolycarbonates, may be used.

Instead of the monomeric dihydroxyaryl compounds, low-molecular-weight, predominantly OH end group terminated oligocarbonates may be used as starting compound.

The dihydroxyaryl compounds may also be used with residual contents of the monohydroxyaryl compounds from which they were produced, or the low-molecular-weight oligocarbonates may also be used with residual contents of the monohydroxyaryl compounds which were eliminated during production of the oligomers. The contents may be up to 20%, preferably 10%, particularly preferably up to 5% and most particularly preferably up to 2% (see e.g. EP-A 1 240 232).

The dihydroxyaryl compounds that are used, like all other raw materials, chemicals and auxiliary substances added to the synthesis, may be contaminated with impurities originating from their own synthesis, handling and storage, although it is desirable and the aim is to work with raw materials, chemicals and auxiliary substances that are as clean as possible.

The diaryl carbonates that are suitable for reacting with the dihydroxyaryl compounds are those having the formula

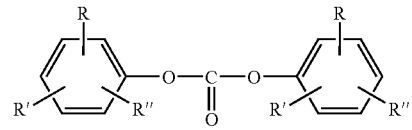

wherein R, R' and R" mutually independently represent H, optionally branched $C_1$-$C_{34}$ alkyl/cycloalkyl, $C_7$-$C_{34}$ alkyl aryl or $C_6$-$C_{34}$ aryl. R may also denote —COO—R''', wherein R''' may be H, optionally branched $C_1$-$C_{34}$ alkyl/cycloalkyl, $C_7$-$C_{34}$ alkyl aryl or $C_6$-$C_{34}$ aryl.

Such diaryl carbonates are, for example: diphenyl carbonate, methylphenyl phenyl carbonates and di(methylphenyl)carbonates, also as a mixture, wherein the methyl group may be in any position on the phenyl rings, and dimethylphenyl phenyl carbonates and di(dimethylphenyl)carbonates, also as a mixture, wherein the methyl groups may be in any position on the phenyl rings, 4-ethylphenyl phenyl carbonate, di-(4-ethylphenyl)carbonate, 4-n-propylphenyl phenyl carbonate, di-(4-n-propylphenyl)carbonate, 4-isopropylphenyl phenyl carbonate, di-(4-isopropylphenyl)carbonate, 4-n-butylphenyl phenyl carbonate, di-(4-n-butylphenyl)carbonate, 4-isobutylphenyl phenyl carbonate, di-(4-isobutylphenyl)carbonate, 4-tert-butylphenyl phenyl carbonate, di-(4-tert-butylphenyl)carbonate, 4-n-pentylphenyl phenyl carbonate, di-(4-n-pentylphenyl)carbonate, 4-n-hexylphenyl phenyl carbonate, di-(4-n-hexylphenyl)carbonate, 4-isooctylphenyl phenyl carbonate, di-(4-isooctylphenyl)carbonate, 4-n-nonylphenyl phenyl carbonate, di-(4-n-nonylphenyl)carbonate, 4-cyclohexylphenyl phenyl carbonate, di-(4-cyclohexylphenyl)carbonate, 4-(1-methyl-1-phenylethyl)phenyl phenyl carbonate, di-[4-(1-methyl-1-phenylethyl)phenyl]carbonate, biphenyl-4-ylphenyl carbonate, di(biphenyl-4-yl)carbonate, 4-(1-naphthyl)phenyl phenyl carbonate, 4-(2-naphthyl)phenyl phenyl carbonate, di-[4-(1-naphthyl)phenyl]carbonate, di-[4-(2-naphthyl)phenyl]carbonate, 4-phenoxyphenyl phenyl carbonate, di-(4-phenoxyphenyl)carbonate, 3-pentadecylphenyl phenyl carbonate, di-(3-pentadecylphenyl)carbonate, 4-tritylphenyl phenyl carbonate, di-(4-tritylphenyl) carbonate, methyl salicylate phenyl carbonate, di(methyl salicylate)carbonate, ethyl salicylate phenyl carbonate, di(ethyl salicylate)carbonate, n-propyl salicylate phenyl carbonate, di-(n-propyl salicylate)carbonate, isopropyl salicylate phenyl carbonate, di(isopropyl salicylate)carbonate, n-butyl salicylate phenyl carbonate, di-(n-butyl salicylate) carbonate, isobutyl salicylate phenyl carbonate, di(isobutyl salicylate)carbonate, tert-butyl salicylate phenyl carbonate, di-(tert-butyl salicylate)carbonate, di(phenyl salicylate)carbonate and di(benzyl salicylate)carbonate.

Preferred diaryl compounds are: diphenyl carbonate, 4-tert-butylphenyl phenyl carbonate, di-(4-tert-butylphenyl) carbonate, biphenyl-4-ylphenyl carbonate, di(biphenyl-4-yl) carbonate, 4-(1-methyl-1-phenylethyl)phenyl phenyl carbonate and di-[4-(1-methyl-1-phenylethyl)phenyl] carbonate.

Particularly preferred is: diphenyl carbonate.

The diaryl carbonates may also be used with residual contents of the monohydroxyaryl compounds from which they were produced. The contents may be up to 20%, preferably 10%, particularly preferably up to 5% and most particularly preferably up to 2%.

Relative to the dihydroxyaryl compound the diaryl carbonates are used in a quantity of 1.02 to 1.30 mol, preferably 1.04 to 1.25 mol, particularly preferably 1.06 to 1.22 mol, most particularly preferably 1.06 to 1.20 mol per mol of dihydroxyaryl compound. Mixtures of the aforementioned diaryl carbonates may also be used.

A monohydroxyaryl compound that was not used to produce the diaryl carbonate being used may additionally be used to influence or modify the end groups. It is represented by the following general formula:

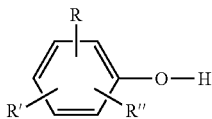

wherein R, R' and R" are defined for the diaryl carbonates, although in this special case R cannot be H, but R' and R" may be H.

Such monohydroxyaryl compounds are, for example: 1-, 2- or 3-methylphenol, 2,4-dimethylphenol, 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl) phenol, 4-phenylphenol, 4-phenoxyphenol, 4-(1-naphthyl) phenol, 4-(2-naphthyl)phenol, 4-tritylphenol, methyl salicylate, ethyl salicylate, n-propyl salicylate, isopropyl salicylate, n-butyl salicylate, isobutyl salicylate, tert-butyl salicylate, phenyl salicylate and benzyl salicylate.

4-tert-Butylphenol, 4-isooctylphenol and 3-pentadecylphenol are preferred.

In regard to the used diaryl carbonate, at least one of the above mentioned monohydroxyaryl compounds should be chosen whose boiling point is above that of the monohydroxyaryl compound used to produce the diaryl carbonate. (In the following text such a monohydroxyaryl compound used to produce a diaryl carbonate is refered to as the base monohydroxyaryl compound). The monohydroxyaryl compound may be added at any time in the course of the reaction. It is preferably added at the start of the reaction or at any point in the course of the process. The proportion of free monohydroxyaryl compound is 0.2 to 20 mol %, preferably 0.4 to 10 mol %, relative to the dihydroxyaryl compound.

The end groups may also be modified by the incorporation of a diaryl carbonate whose base monohydroxyaryl compound has a higher boiling point than the base monohydroxyaryl compound in the principal diaryl carbonate that is used. Here too the diaryl carbonate may be added at any time in the course of the reaction. It is preferably added at the start of the reaction or at any point in the course of the process. The proportion of the diaryl carbonate with the higher-boiling base monohydroxyaryl compound relative to the total amount of diaryl carbonate used may be 1 to 40 mol %, preferably 1 to 20 mol % and particularly preferably 1 to 10 mol %.

The basic catalysts known from the literature such as e.g. alkali and alkaline-earth hydroxides and oxides, but also ammonium or phosphonium salts, referred to below as onium salts, are used as catalysts in the melt transesterification process for the production of polycarbonates. Onium salts are preferably used in the synthesis, particularly preferably phosphonium salts. Phosphonium salts within the meaning of the invention are those having the general formula:

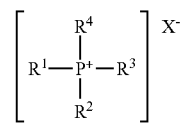

wherein $R^{1-4}$ independently one of the others denote $C_1$-$C_{10}$ alkyls, $C_6$-$C_{14}$ aryls, $C_7$-$C_{15}$ aryl alkyls or $C_5$-$C_6$ cycloalkyls, preferably methyl or $C_6$-$C_{14}$ aryls, particularly preferably methyl or phenyl, and $X^-$ is an anion such as hydroxide, sulfate, hydrogen sulfate, hydrogen carbonate, carbonate or a halide, preferably chloride or an alkylate or arylate having the formula —OR, wherein R is a $C_6$-$C_{14}$ aryl, $C_7$-$C_{15}$ aryl alkyl or $C_5$-$C_6$ cycloalkyl, preferably phenyl.

Preferred catalysts are tetraphenyl phosphonium chloride, tetraphenyl phosphonium hydroxide and tetraphenyl phosphonium phenolate, with tetraphenyl phosphonium phenolate being particularly preferred.

They are preferably used in quantities of $10^{-8}$ to $10^{-3}$ mol, relative to one mol of dihydroxyaryl compound, particularly preferably in quantities of $10^{-7}$ to $10^{-4}$ mol.

It is possible to add supplementary amounts of an onium catalyst of the same or of a different type of onium catalyst before polycondensation.

The catalysts are added in solution to avoid harmful excess concentrations during metering. The solvents are compounds which are already part of the reaction mixture and for formed during the process, such as e.g. dihydroxyaryl compounds, diaryl carbonates or monohydroxyaryl compounds. Monohydroxyaryl compounds are particularly preferred, because the person skilled in the art is aware that dihydroxyaryl compounds and diaryl carbonates readily change and break down even at slightly elevated temperatures, especially under the influence of catalysts. This affects the quality of the polycarbonates. In the industrial transesterification process for the production of polycarbonate the preferred compound is phenol. Phenol is also the logical choice because the preferably used catalyst tetraphenyl phosphonium phenolate when produced as a mixed crystal is isolated with phenol.

Thermoplastic polycarbonates are described by the formula

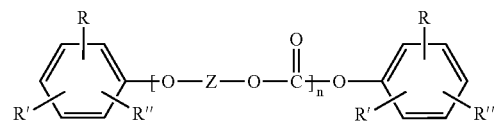

and are also provided by the present invention.

The brackets denote a structural unit repeated n times.

Z is as defined above for the dihydroxyaryl compounds.

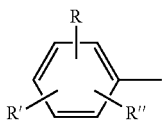

is as defined above for the diaryl carbonates and may also be H. The end groups may differ one from the other.

The polycarbonates have an extremely low content of cations and anions of less than 60 ppb in each case, preferably <40 ppb and particularly preferably <20 ppb (calculated as Na cation), cations of both alkali and alkaline-earth metals being present, which may originate for example as an impurity from the raw materials that are used and from the phosphonium and ammonium salts. Other ions such as Fe, Ni, Cr, Zn, Sn, Mo, Al ions and homologues thereof may be contained in the raw materials or may originate through erosion or corrosion from the materials from which the production line is constructed. The total content of these ions is less than 2 ppm, preferably less than 1 ppm and particularly preferably less than 0.5 ppm.

Anions from inorganic acids and from organic acids (e.g. chloride, sulfate, carbonate, phosphate, phosphite, oxalate, etc.) are present in equivalent amounts with regard to the above mentioned cations.

The aim is therefore to obtain the smallest possible amounts, which may only be achieved by using raw materials of the highest purity. Such pure raw materials may only be obtained by means of purification processes such as recrystallisation, distillation, reprecipitation with washing, etc.

The polycarbonates may be intentionally branched. Suitable branching agents are the compounds known for polycarbonate production having three or more functional groups, preferably those having three or more hydroxyl groups.

Examples of some of the compounds having three or more phenolic hydroxyl groups that may be used are: phloroglucinol, 4,6-dimethyl-2,4,6-tri-(4-hydroxyphenyl) heptene-2, 4,6-dimethyl-2,4,6-tri-(4-hydroxyphenyl) heptane, 1,3,5-tri-(4-hydroxyphenyl)benzene, 1,1,1-tri-(4-hydroxyphenyl) ethane, tri-(4-hydroxyphenyl)phenyl methane, 2,2-bis-(4,4-bis-(4-hydroxyphenyl)cyclohexyl]propane, 2,4-bis-(4-hydroxyphenyl isopropyl)phenol and tetra-(4-hydroxyphenyl) methane.

Some of the other trifunctional compounds are: 2,4-dihydroxybenzoic acid, trimesic acid, cyanuric chloride and 3,3-bis-(3-methyl-4-hydroxyphenyl)-2-oxo-2,3-dihydroindole.

Preferred branching agents are: 3,3-bis-(3-methyl-4-hydroxyphenyl)-2-oxo-2,3-dihydroindole and 1,1,1-tri-(4-hydroxyphenyl)ethane.

The branching agents are used in quantities of 0.02 to 3.6 mol %, relative to the dihydroxyaryl compound.

The process for the production of polycarbonate by the transesterification process may be performed continuously or batchwise. Once the dihydroxyaryl compounds and diaryl carbonates, optionally with other compounds, are in melt form, the reaction is started in the presence of suitable catalysts. The conversion or the molecular weight is increased with rising temperatures and falling pressures in suitable equipment and devices by drawing off the monohydroxyaryl compound that is eliminated, until the desired final state is achieved. The type and concentration of the end groups is determined by the choice of the ratio of dihydroxyaryl compound to diaryl carbonate, of the rate of loss of diaryl carbonate via the vapors, which is determined by the choice of processing mode or installation for production of the polycarbonate, and of optionally added compounds such as a higher-boiling monohydroxyaryl compound, for example.

There are no limits or restrictions on the type and nature of the process, on the installation in which and mode by which it is performed.

In addition, there are no special limits or restrictions on the temperatures, the pressures and the catalysts used to perform the melt transesterification reaction between the dihydroxyaryl compound and the diaryl carbonate and any other reactants that are optionally added. Any condition is possible, provided that the chosen temperatures, pressures and catalysts allow melt transesterification to be performed with correspondingly rapid removal of the monohydroxyaryl compound that is eliminated.

The temperatures over the entire process are between 180 and 330° C., the pressures between 15 bar, absolute, and 0.01 mbar, absolute.

A continuous processing mode is usually chosen because it is advantageous for product quality.

The continuous process for the production of polycarbonates is preferably characterized in that one or more dihydroxyaryl compounds reacts with the diaryl carbonate, optionally also with other added reactants in the presence of catalysts to form a pre-condensate. After precondensation and/or separation of the monohydroxyaryl compound that is formed, the molecular weight is increased to the desired level in one or more subsequent reaction-evaporator stages with gradually increasing temperatures and gradually reducing pressures.

According to the course of the process, the suitable devices, equipment and reactors for the individual reaction-evaporator stages are heat exchangers, decompression units, separators, columns, evaporators, stirred vessels and reactors or other commercial equipment which provides the necessary residence time at selected temperatures and pressures. The chosen devices must permit the necessary heat input and be constructed in a manner suitable for processing the material that entails continuously increasing melt viscosities.

All devices are connected to one another by means of pumps, pipes and valves. The pipes between all units should naturally be as short as possible, and the curvature of the pipes kept as low as possible, to avoid unnecessarily extended residence times. The external, i.e. technical, boundary conditions and requirements for the assembly of chemical installations must be observed.

To perform the process by a preferred continuous processing mode the reactants may either be melted together or the solid dihydroxyaryl compound may be dissolved in the diaryl carbonate melt or the solid diaryl carbonate in the melt of the dihydroxyaryl compound, or both raw materials are combined as a melt, preferably directly from production. The residence times of the separate melts of the raw materials, in particular that of the melt of the dihydroxyaryl compound, are made as short as possible. The mixture of melts on the other hand, because of the lower melting point of the mixture of raw materials in comparison to the individual raw materials, may reside for longer at correspondingly lower temperatures with no loss of quality.

In the next step the catalyst preferably dissolved in phenol, is incorporated in the melt and the resulting mixture heated to the reaction temperature. At the start of the industrial process for the production of polycarbonate from 2,2-bis-(4-hydroxyphenyl)propane and diphenyl carbonate this is 180 to 220° C., preferably 190 to 210° C., most particularly preferably 190° C. With residence times of 15 to 90 min, preferably 30 to 60 min, the reaction equilibrium is established without the hydroxyaryl compound that is formed being removed. The reaction may be performed at atmospheric pressure or also for technical reasons at overpressure. The preferred pressure in industrial production lines is 2 to 15 bar absolute.

The molten mixture is decompressed in a first vacuum chamber whose pressure is set to 100 to 400 mbar, preferably 150 to 300 mbar, and immediately afterwards heated to the inlet temperature again in a suitable device at the same pressure. In the decompression process the hydroxyaryl compound that is formed is evaporated with monomers that are still present. After a residence time of 5 to 30 min in a settling tank, optionally with forced circulation, at the same pressure and the same temperature, the reaction mixture is decompressed in a second vacuum chamber whose pressure is 50 to 200 mbar, preferably 80 to 150 mbar, and immediately afterwards heated to a temperature of 190 to 250° C., preferably 210 to 240° C., particularly preferably 210 to 230° C., in a suitable device at the same pressure. Here too the hydroxyaryl compound that is formed is evaporated with monomers that are still present. After a residence time of 5 to 30 min in a settling tank, optionally with forced circulation, at the same pressure and the same temperature, the reaction mixture is decompressed in a third vacuum chamber whose pressure is 30 to 150 mbar, preferably 50 to 120 mbar, and immediately afterwards heated to a temperature of 220 to 280° C., preferably 240 to 270° C., particularly preferably 240 to 260° C., in a suitable device at the same pressure. Here too the hydroxyaryl compound that is formed is evaporated with monomers that are still present. After a residence time of 5 to 20 min in a settling tank, optionally with forced circulation, at the same pressure and the same temperature, the reaction mixture is decompressed in a further vacuum chamber whose pressure is 5 to 100 mbar, preferably 15 to 100 mbar, particularly preferably 20 to 80 mbar, and immediately afterwards heated to a temperature of 250 to 300° C., preferably 260 to 290° C., particularly preferably 260 to 280° C., in a suitable device at the same pressure. Here too the hydroxyaryl compound that is formed is evaporated with monomers that are still present.

The number of these stages, 4 in this case by way of example, may vary between 2 and 6. If the number of stages is changed, the temperatures and pressures should be adjusted accordingly to give comparable results. The relative viscosity of the oligomeric carbonate reached in these stages is between 1.04 and 1.20, preferably between 1.05 and 1.15, particularly preferably between 1.06 and 1.10.

After a residence time of 5 to 20 min in a settling tank, optionally with forced circulation, at the same pressure and same temperature as in the last flash/evaporator stage, the oligocarbonate produced in this way is supplied to a disc reactor or basket reactor and condensed further at 250 to 310° C., preferably 250 to 290° C., particularly preferably 250 to 280° C., at pressures of 1 to 15 mbar, preferably 2 to 10 mbar, for residence times of 30 to 90 min, preferably 30 to 60 min. The product reaches a relative viscosity of 1.12 to 1.28, preferably 1.13 to 1.26, particularly preferably 1.13 to 1.24.

The melt leaving this reactor is adjusted to the desired final viscosity or final molecular weight in another disc or basket reactor. The temperatures are 270 to 330° C., preferably 280 to 320° C., particularly preferably 280 to 310° C., the pressure 0.01 to 3 mbar, preferably 0.2 to 2 mbar, with residence times of 60 to 180 min, preferably 75 to 150 min. The relative viscosities are adjusted to the level required for the intended application and are 1.18 to 1.40, preferably 1.18 to 1.36, particularly preferably 1.18 to 1.34.

The function of the two basket reactors may also be combined in one basket reactor. This is the case in a preferred embodiment of the present invention.

The vapors from all process stages are immediately drawn off, collected and processed. This processing is generally carried out by distillation in order to obtain high purities in the recovered substances. This may be done for example in accordance with German patent application no. 10 100 404. From an economic and ecological perspective, it is self-evident that the monohydroxyaryl compound that is eliminated should be recovered and isolated in the purest form. The monohydroxyaryl compound may be used directly for the production of a dihydroxyaryl compound or a diaryl carbonate.

The disc or basket reactors are characterized in that they provide a very large, constantly renewing surface at the vacuum with high residence times. The geometry of the disc or basket reactors is designed according to the melt viscosities of the products. Reactors such as those described in DE 44 47 422 C2 and EP A 1 253 163 or twin-screw reactors such as those described in WO A 99/28 370 are suitable, for example.

The oligocarbonates, even those having a very low molecular weight, and the finished polycarbonates are generally conveyed by means of gear pumps, screws of various designs or specially designed positive-displacement pumps.

Particularly suitable materials for the production of the equipment, reactors, pipes, pumps and fittings are stainless steels of type Cr Ni (Mo) 18/10, such as e.g. 1.4571 or 1.4541 (Stahlschlüssel 2001, publisher: Stahlschlüssel Wegst GmbH, Th-Heuss-Straße 36, D-71672 Marbach) and Ni-based alloys of type C, such as e.g. 2.4605 or 2.4610 (Stahlschlüssel 2001, publisher: Stahlschlüssel Wegst GmbH, Th-Heuss-Straße 36, D-71672 Marbach). Stainless steels are used up to process temperatures of around 290° C. and Ni-based alloys at process temperatures above around 290° C.

The process parameters such as ratio of diaryl carbonate to dihydroxyaryl compound at the start of the process, pressure, temperature and residence time should be chosen in the whole production line before the final or finishing reactor so that a molecular weight that is adequate for the intended application of the product being produced and low OH end group contents are achieved before the reaction melt enters the final or finishing reactor.

The final molecular weight is substantially dependent on the chosen outlet temperature from the reactor, the pressure and the OH end group concentration. These conditions must therefore be chosen in the penultimate reactor so that the desired end product may be produced.

The weight-average molecular weight Mw is set so that a maximum Mw of 28,000, preferably a maximum Mw of 26,000 and particularly preferably a maximum Mw of 24,000 is achieved.

The content of OH end groups in the polycarbonates is between 50 and 750 ppm, preferably between 70 and 500 ppm, particularly preferably between 90 and 400 ppm and most particularly preferably between 100 and 300 ppm.

After the penultimate reactor the melt is intensively mixed with a suitable inhibitor to stop the reaction. The monomers may then be evaporated off in the finishing reactor.

In the conventional devices for removal of residual monomers the residence times are short. Since the kinetics are slow, however, and the reaction therefore cannot be terminated, after residual monomer removal the polymer may easily reform monomers during subsequent processing if it is not properly inhibited. This disadvantage cannot occur in the process according to the invention.

Suitable inhibitors are acid components such as Lewis or Brønsted acids or esters of strong acids. The pKa value of the inhibitor should not exceed 5 and should preferably be less than 3. The acid component or esters thereof are added to deactivate the reaction mixture, in other words ideally to bring the reaction completely to a standstill. The acid component is added in concentrations of <20 ppm, preferably <10 ppm, particularly preferably <5 ppm and most particularly preferably $\leq$2.5 ppm. Surprisingly these quantities are sufficient, even though the person skilled in the art reckons that the requisite amounts should be at least equivalent to the amounts of catalyst used and thus requiring neutralization. In fact the prior art, see above, even requires a multiple excess of inhibitor relative to the amount of catalyst used. In a preferred embodiment of the process according to the invention 0.00004 mol of phosphonium catalyst are added before the reaction per mol of dihydroxyaryl compound used, preferably tetraphenyl phosphonium phenolate. When the desired molecular weight is reached, the detectable amount of P is in the 1 ppm range. The molar amounts of inhibitor to be used according to the invention, however, are below the residual molar amounts of catalyst that may be assumed from the P value.

Embodiments are preferred, particularly preferred or most particularly preferred that make use of the parameters, compounds, definitions and explanations cited as being preferred, particularly preferred or most particularly preferred.

The definitions, parameters, compounds and explanations set out in the description in general terms or in preferential ranges may also be combined with one another in any way, however, in other words between the various ranges and preferential ranges.

Examples of suitable acid components are: ortho-phosphoric acid, phosphorous acid, pyrophosphoric acid, hypophosphoric acid, polyphosphoric acids, benzenephosphonic acid, sodium dihydrogen phosphate, boric acid, aryl boric acids, hydrochloric acid (hydrogen chloride), sulfuric acid, ascorbic acid, oxalic acid, benzoic acid, salicylic acid, formic acid, acetic acid, adipic acid, citric acid, benzene sulfonic acid, toluene sulfonic acid, dodecyl benzene sulfonic acid and all other phenyl-substituted benzene sulfonic acids, nitric acid, terephthalic acid, isophthalic acid, stearic acid and other fatty acids, acid chlorides such as phenyl chloroformate, stearic acid chloride, acetoxy-BP-A, benzoyl chloride and esters, semi-esters and bridged esters of the aforementioned acids, such as e.g. toluene sulfonic acid ester, phosphoric acid ester, phosphorous acid ester, phosphonic acid ester, dimethyl sulfate, boric acid ester, aryl boric acid ester and other components generating acid under the influence of water, such as tri-iso-octyl phosphine, Ultranox 640 and BDP (bisphenol diphosphate oligomer).

Preferred examples are ortho-phosphoric acid, phosphorous acid, pyrophosphoric acid, hypophosphoric acid, polyphosphoric acids, benzenephosphonic acid, sodium dihydrogen phosphate, boric acid, aryl boric acids, benzoic acid, salicylic acid, benzene sulfonic acid, toluene sulfonic acid, dodecyl benzene sulfonic acid and all other phenyl-substituted benzene sulfonic acids, acid chlorides such as phenyl chloroformate, stearic acid chloride, acetoxy-BP-A, benzoyl chloride and esters, semi-esters and bridged esters of the aforementioned acids such as e.g. toluene sulfonic acid ester, phosphoric acid ester, phosphorous acid ester, phosphonic acid ester, boric acid ester, aryl boric acid ester and other components generating acid under the influence of water, such as tri-iso-octyl phosphine, Ultranox 640 and BDP.

Particularly preferred examples are ortho-phosphoric acid, pyrophosphoric acid, polyphosphoric acids, benzenephosphonic acid, benzoic acid, benzene sulfonic acid, toluene sulfonic acid, dodecyl benzene sulfonic acid and all other phenyl-substituted benzene sulfonic acids and esters, semi-esters and bridged esters of the aforementioned acids such as e.g. toluene sulfonic acid ester, phosphoric acid ester, phosphorous acid ester, phosphonic acid ester and other components generating acid under the influence of water, such as tri-iso-octyl phosphine, Ultranox 640 and BDP.

Most particularly preferred examples are ortho-phosphoric acid, pyrophosphoric acid, benzene sulfonic acid, toluene sulfonic acid, dodecyl benzene sulfonic acid and all other phenyl-substituted benzene sulfonic acids and esters, semi-esters and bridged esters of the aforementioned acids, such as e.g. toluene sulfonic acid ester and phosphoric acid ester.

The acid components may be added in solid, liquid or gaseous form. In a preferred processing mode the acid component is added continuously and homogeneously to the product stream to be freed from monomers in the production process directly after the desired final molecular weight is achieved, in order to begin evaporating the residual monomers immediately thereafter. In a particularly preferred processing mode, the addition of additives to improve individual product properties takes place after addition of the acid and residual monomer reduction and is not combined with the residual monomer reduction step, because additives are often used that are volatile in the vacuum that is essential for reduction of the residual monomers and they are then difficult to establish in the necessary concentrations in the polymer.

The acid components are preferably added in liquid form. Since the amounts to be added are very small, solutions of the acid components are preferably used.

Suitable solvents are those that do not disrupt the process, are chemically inert and evaporate quickly.

Examples of suitable solvents are all organic solvents with a boiling point under normal pressure of 30 to 300° C., preferably 30 to 250° C. and particularly preferably 30 to 200° C. and also water—including water of crystallisation. Such compounds are preferably chosen that occur in the various processes. Depending on the range of requirements for the product to be produced, any residual amounts do not reduce the quality.

Solvents in addition to water are alkanes, cycloalkanes and aromatics, which may also be substituted. The substituents may be aliphatic, cycloaliphatic or aromatic radicals in various combinations and halogens or a hydroxyl group. Heteroatoms such as oxygen for example may also be binding links between aliphatic, cycloaliphatic or aromatic radicals, wherein the radicals may be the same or different. Other solvents may also be ketones and esters of organic acids, and cyclic carbonates.

Examples in addition to water are n-pentane, n-hexane, n-heptane and isomers thereof, cyclohexane, toluene and xylene, methylene chloride, ethyl chloride, ethylene chloride, chlorobenzene, methanol, ethanol, propanol, butanol and isomers thereof, phenol, o-, m- and p-cresol, diethyl ether, dimethyl ketone, polyethylene glycols, polypropylene glycols, ethyl acetate, ethylene carbonate and propylene carbonate.

Water, phenol, propylene carbonate, ethylene carbonate and toluene are preferably suitable for the polycarbonate process.

Water, phenol and propylene carbonate are particularly preferably suitable.

Static mixers or other mixers leading to a homogeneous incorporation, such as extruders for example, are suitable for the effective incorporation of the inhibitor.

A preferred processing mode is cited by way of example but without restriction: Using a gear pump a split stream is taken from the melt stream between the penultimate reactor and the finishing reactor and the inhibitor is added to this split stream. Immediately thereafter the mixture is pumped back into the main stream through a static mixer to mix it intensively. Downstream of the inlet point is another static mixer which ensures a homogeneous distribution in the main melt stream, which is then supplied to the final reactor.

In the final reactor, which is used for residual monomer reduction, the residual monomers are then reduced at temperatures of 260 to 310° C., preferably 265 to 300° C. and particularly preferably 270 to 290° C., and under pressures of 0.01 to 3 mbar, preferably 0.2 to 2.5 mbar and particularly preferably 0.4 to 2 mbar. The fill levels in the final reactor are set as low as are technically possible.

The residence time in the final or finishing reactor is in the order of a few minutes to hours, preferably between 15 and 180 min, particularly preferably 15 to 150 min and most particularly preferably 15 to 120 min.

A slight increase in molecular weight which may possibly occur in the finishing reactor in which the residual monomers are evaporated may be balanced out by reducing the entry molecular weight by an amount such that after evaporation of the residual monomers the final molecular weight is achieved exactly.

The finished polycarbonate is removed from the final rector with a pumping device, treated with additives by known methods to improve properties if necessary, extracted as bristles, cooled and granulated.

A gear pump is generally used as the pumping device. Screws of various designs or specially designed positive-displacement pumps may also be used as an alternative.

The polycarbonate thus obtained ideally contains less than 350 ppm of diphenyl carbonate (DPC), 40 ppm of 2,2-bis-(4-hydroxyphenyl)propane (BPA) and 150 ppm of phenol, preferably less than 300 ppm of DPC, 30 ppm of BPA and 100 ppm of phenol, particularly preferably less than 250 ppm of DPC, 20 ppm of BPA and 80 ppm of phenol and especially particularly preferably less than 200 ppm of DPC, 15 ppm of BPA and 70 ppm of phenol.

The polycarbonates obtained may be treated with the conventional additives and supplementary substances (e.g. auxiliary substances and reinforcing materials) to modify their properties. The addition of additives and loading materials serves to extend the service life (e.g. hydrolysis or degradation stabilizers), to improve color stability (e.g. heat and UV stabilizers), to simplify processing (e.g. mold release agents, flow control agents), to improve functional properties (e.g. antistatics), to improve fire proofing, to influence the appearance (e.g. organic colorants, pigments) or to adjust the polymer properties to specific stresses (impact modifiers, finely divided minerals, fibrous materials, silica flour, glass fibers and carbon fibers). They may all be combined in any way to adjust and achieve the desired properties. Such loading materials and additives are described for example in "Plastics Additives", R. Gächter and H. Müller, Hanser Publishers 1983, in Additives for Plastics Handbook, John Murphy, Elsevier, Oxford 1999 or in Plastics Additives Handbook, Hans Zweifel, Hanser, Munich 2001.

These additives and loading materials may be added to the polymer melt individually or in any mixture or in several different mixtures, directly during isolation of the polymer or after melting of the granules in a so-called compounding stage.

The additives and loading materials or mixtures thereof may be added to the polymer melt as a solid, in other words as a powder, or as a melt. Another means of addition is the use of masterbatches or mixtures of masterbatches of the additives or additive blends.

These substances are preferably added to the finished polycarbonate using known metering units but depending on requirements they may also be added at a different stage of the polycarbonate production process. Mixing with the polymer takes place in known devices for this purpose, such as screws or static mixers, for example.

The polycarbonates that may be obtained by the process described in the invention may be processed into various molded articles on known machines, for example on extruders or injection molding machines.

Possible applications for the polycarbonates obtained by the described invention, depending on molecular weight and treatment with additives of any type, are, for example:

Extrusion and solution films for displays, electric motors, ski films, packaging films for pharmaceutical preparations, etc.

Blown containers, e.g. 1 to 5 gallon water bottles (see e.g. U.S. Pat. No. 2,964,794)

Optical data storage media, e.g. CDs and DVDs, and other data storage media

Chip boxes and chip carriers

Oxygenators, dialysis machines, etc., in medicine

Protective goggles, corrective spectacles, lenses for photographic and film cameras (see e.g. DE-A 2 701 173), etc.

Precision injection molded parts, such as e.g. lens holders, mostly expediently using glass-fiber-reinforced polycarbonate which optionally also contains 1 to 10 wt. % $MoS_2$ Light carriers such as optical fibers (see e.g. EP-A1 0 089 801)

Supports for organic photoconductors

Mobile telephone casings with improved resistance to perfume, aftershave and perspiration Network interface devices Electrical insulating materials for electrical cables, connector shells and plug-in connectors Housings for e.g. electrical distribution cabinets, electrical devices, domestic appliances Components for household items, electrical and electronic devices Bottles, crockery, chocolate molds, etc., for food applications Kitchen sinks and letterboxes Transparent washing machines, portholes with improved resistance to detergent solution Lamp covers for kitchen appliances with improved resistance to kitchen vapors, particularly oil vapors Safety glass for buildings, vehicles, aircraft and helmet visors Translucent sheets, in particular twin-wall sheets, for example for covering buildings such as stations, halls and greenhouses Translucent plastics containing glass fibers for lighting applications (see e.g. DE-A 1 554 020)

Translucent plastics containing barium sulfate, titanium dioxide and/or zirconium oxide or organic polymer acrylate rubbers (see e.g. EP-A 634 445 and EP-A 269324) for producing translucent and light-scattering molded parts Foams (see e.g. DE-A 1 031 507)

Threads and wires (see e.g. DE-A 1 137 167 and DE-A 1 785 137)

Stable doors and animal cages

Sports articles, such as e.g. slalom poles, ski boot clips, etc.

Lights, such as e.g. headlamps, diffusers, internal lenses and lamp covers

Bumpers, optionally in the form of suitable blends with ABS or suitable rubbers, where contact may occur with fuels and lubricants Motorcycle and safety helmets Automotive parts such as e.g. windows, instrument panels, body parts and shock absorbers Traffic light housings and road signs.

Products made from the polycarbonate according to the invention are also provided by the present invention.

Determination of the cited analytical characteristics:

Relative Viscosity:

The relative viscosity is determined as the quotient of the viscosity of the solvent and the viscosity of the polymer dissolved in this solvent. It is determined in dichloromethane with a concentration of 5 g/l solution at 25° C.

Molecular Weight:

The weight-average molecular weight Mw is determined from light-scattering measurements.

Alternatively the weight-average molecular weight Mw may be calculated by measuring the intrinsic viscosity by means of known Mark-Houwing correlations (J. Brandrup, E. H. Immergut—Polymer Handbook). In restricted molecular weight ranges a good approximation of the Mw may be calculated from the relative viscosity using known correlations.

The weight-average molecular weight Mw may also be calculated from gel permeation chromatography (GPC) measurements. This requires the measurement system to be calibrated with suitable polycarbonate standards, or it may be determined by direct molecular weight determination in GPC by means of additional light-scattering detection.

OH End Group:

The content of phenolic OH is obtained by IR measurement. To this end a differential measurement is taken for a solution of 2 g polymer in 50 ml dichloromethane as compared with pure dichloromethane and the absorption difference determined at 3582 cm$^{-1}$.

Residual Monomers:

To determine the residual monomers the sample is dissolved in dichloromethane and then precipitated with acetone/methanol. After separating off the precipitated polymer the filtrate is concentrated to small volume. The residual monomers are quantified by reverse phase chromatography in the mobile solvent gradient 0.04% phosphoric acid—acetonitrile. Detection is by UV.

The examples below are intended to illustrate the invention without however restricting it:

EXAMPLES

Comparative Example 1

45.66 g (0.2 mol) of bisphenol A, 46.27 g (0.216 mol) of diphenyl carbonate and 0.0053 g ($4 \times 10^{-3}$ mol %) of phenol adduct of tetraphenyl phosphonium phenolate, containing 35% phenol, relative to bisphenol A, are weighed into a 500 ml three-neck flask with stirrer, internal thermometer and Vigreux column (30 cm, mirrored) with bridge. The apparatus is freed from atmospheric oxygen by application of a vacuum and rinsing (three times) with nitrogen and the mixture melted at 150° C. and 100 mbar. The temperature is increased to 190° C. and the phenol that is formed is distilled off over 30 minutes. The temperature is then increased to 235° C. and the phenol that is formed is distilled off for 10 minutes. The vacuum is then adjusted to 60 mbar within 10 minutes and the temperature adjusted at the same time to 300° C. After a further 10 minutes the vacuum is reduced to 0.5 mbar and stirring is continued for 30 minutes. A sample 1 is then taken under normal pressure in the nitrogen counterflow, from which the relative viscosity, content of phenolic OH end groups and residual monomers are determined.

The remaining batch is then stirred with no further additions for two more hours at 300° C. and 0.5 mbar to evaporate the residual monomers (sample 2). The results are shown in Table 1.

Example 1

Same as comparative example 1 but with addition of 2.5 ppm of 10% aqueous phosphoric acid after removal of sample 1, stirring is continued for two more hours at 300° C. and 0.5 mbar to evaporate the residual monomers. The results are shown in Table 1.

Comparative Example 2

136.98 g (0.6 mol) of bisphenol A, 134.96 g (0.63 mol) of diphenyl carbonate and 0.0159 g ($4 \times 10^{-3}$ mol %) of phenol adduct of tetraphenyl phosphonium phenolate, containing 35% phenol, relative to bisphenol A, are weighed into a 500 ml three-neck flask with stirrer, internal thermometer and Vigreux column (30 cm, mirrored) with bridge. The apparatus is freed from atmospheric oxygen by application of a vacuum and rinsing (three times) with nitrogen and the mixture is melted at 190° C. and the phenol that is formed is distilled off. A vacuum of 100 mbar is then applied and distillation continued for a further 20 minutes. The temperature is then increased to 235° C. and the phenol that is formed is distilled off for 15 minutes. The vacuum is then adjusted to 60 mbar within 5 minutes and held for 15 minutes. The temperature is raised to 250° C. and the plateau held for 15 minutes. The pressure is then reduced to 5 mbar for 15 minutes, after which the temperature is raised to 280° C. After a further 15 minutes the vacuum is reduced to 0.5 mbar and stirring continued for a further 15 minutes. The temperature is then raised to 300° C. and held for 30 min. A sample 1 is then taken at normal pressure under a nitrogen atmosphere, from which the relative viscosity, the content of phenolic OH end groups and the residual monomers are determined.

The remaining batch is then stirred with no further additions for two more hours at 300° C. and 0.5 mbar to evaporate the residual monomers (sample 2). The results are shown in Table 1.

Example 2

Same as comparative example 2 but with addition of 2.5 ppm of 10% aqueous phosphoric acid after removal of sample 1, stirring is continued for two more hours at 300° C. and 0.5 mbar to evaporate the residual monomers. The results are shown in Table 1.

Example 3

8600 kg/h of melt mixture, consisting of 4425 kg of diphenyl carbonate/h (20,658 mol/h) and 4175 kg of bisphenol A/h (18,287 mol/h), with addition of 0.52 kg of the phenol adduct of tetraphenyl phosphonium phenolate with 65.5% tetraphenyl phosphonium phenolate/h (0.786 mol/h, i.e. 0.0043 mol %) dissolved in 4.5 kg of phenol/h, are pumped from a tank through a heat exchanger, heated to 190° C. and passed through a detention column at 12 bar and 190° C. The average residence time is 50 minutes.

The melt is then passed through a decompression valve into a separator under a pressure of 200 mbar. The melt flowing out of the separator is heated to 189° C. again in a falling-film evaporator which is likewise under 200 mbar of pressure and collected in a tank. After a residence time of 20 minutes the melt is pumped into the next three stages, which are constructed in the same way. The conditions in the $2^{nd}/3^{rd}/4^{th}$ stage are 100/74/40 mbar; 218/251/276° C. and 20/10/10 minutes. The oligomer that is formed has a relative viscosity of 1.09. All vapors are passed through pressure regulators into a column under vacuum and drawn off as condensates.

The oligomer is then condensed in an adjacent basket reactor at 278° C. and 3.0 mbar for a residence time of 45 minutes to form a higher molecular weight product. The relative viscosity is 1.195. The vapors are condensed.

A split stream of 150 kg of melt/h is branched off from the melt stream by means of a gear pump as it is passed to another basket reactor, 185 g of a 5% aqueous phosphoric acid/h are added, it is passed through a static mixer with a length to diameter ratio of 20 and returned to the main melt stream. Immediately after the two streams meet, the phosphoric acid is homogeneously distributed through the entire melt stream by means of a further static mixer.

The melt treated in this way is exposed to the process conditions in another basket reactor at 284° C., 0.7 mbar and for an average residence time of a further 130 minutes, removed and granulated.

The vapors are condensed in the vacuum installation and thereafter.

The polycarbonate obtained has the characteristics set out in Table 1.

TABLE 1

|  |  | Relative viscosity | Phenolic OH [ppm] | DPC [ppm] | BPA [ppm] | Phenol [ppm] |
|---|---|---|---|---|---|---|
| Comp. example 1 | Sample 1 | 1.26 | 640 | 190 | 25 | 70 |
|  | Sample 2 | 1.31 | 380 | 68 | 17 | 45 |
| Comp. example 2 | Sample 1 | 1.21 | 420 | 245 | 15 | 84 |
|  | Sample 2 | 1.25 | 310 | 192 | 5 | 36 |
| Example 1 | Sample 1 | 1.26 | 380 | 183 | 20 | 52 |
|  | Sample 2 | 1.27 | 330 | 31 | 18 | 48 |

TABLE 1-continued

|  |  | Relative viscosity | Phenolic OH [ppm] | DPC [ppm] | BPA [ppm] | Phenol [ppm] |
|---|---|---|---|---|---|---|
| Example 2 | Sample 1 | 1.20 | 390 | 234 | 17 | 72 |
|  | Sample 2 | 1.20 | 350 | 64 | 7 | 39 |
| Example 3 |  | 1.201 | 255 | 71 | 6 | 56 |

As may be seen from the examples, the process according to the invention surprisingly does not lead to a further increase in molecular weight with a low monomer content in the end product.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A multi stage process for the production of polycarbonates having low monomer content comprising in sequence
   (i) transesterifying in the melt at least one dihydroxyaryl compound with at least one diaryl carbonate in the presence of at least one onium catalyst to produce a polycondensate that contains monomers,
   (ii) introducing into the polycondensate an inhibitor in an hypostoichiometric amount in relation to the catalyst said inhibitor selected from the group consisting of Lewis or Bronsted acid and an ester of a strong acid, and
   (iii) reducing in a finishing reactor the content of monomers in said polycondensate
   the process performed without alkali or alkaline-earth catalysts carried out in more than one reactor.

2. The process according to claim 1, wherein the polycarbonate has a weight average molecular weight of at most 30,000 g/mole.

3. The process of claim 1 wherein the palycarbonate is characterized in that its content of OH end groups is between 50 and 750 ppm.

4. The process according to claim 3 characterized in that the OH end group content is between 70 and 500 ppm.

5. The process of claim 1 wherein the inhibitor has a pKa value not exceeding 5.

6. The process according to claim 1 wherein the inhibitor is a member selected from the group consisting of ortho-phosphoric acid and acid ester of ortho-phosphoic acid.

7. The process according to claim 1 wherein the amount of inhibitor is <8 ppm.

8. The process according to claims 1 wherein the reducing the content of monomers in said polycondensate is carried out at temperatures not exceeding 310° C.

9. The process according to claim 1 wherein the residence time in the finishing reactor is 15 to 150 min.

10. The polycarbonate obtained by the process according to claim 1.

11. The polycarbonate of claim 10 wherein the polycarbonate contains less than 350 ppm of diphenyl carbonate, less than 40 ppm of 2,2-bis-(4-hydroxyphenyl) propane and less than 150 ppm of phenol.

* * * * *